United States Patent
Luo et al.

(10) Patent No.: US 10,820,304 B2
(45) Date of Patent: Oct. 27, 2020

(54) NAV SETTING METHOD IN WIRELESS COMMUNICATIONS SYSTEM AND RELATED DEVICE

(71) Applicant: Huawei Technologies Co., Ltd., Shenzhen (CN)

(72) Inventors: Jun Luo, Shanghai (CN); Chixiang Ma, Shanghai (CN); Jiyong Pang, Shanghai (CN); Peter Loc, Cupertino, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/873,297

(22) Filed: Jan. 17, 2018

(65) Prior Publication Data
US 2018/0146469 A1    May 24, 2018

Related U.S. Application Data

(63) Continuation of application No. PCT/CN2015/089002, filed on Sep. 6, 2015.

(30) Foreign Application Priority Data

Jul. 17, 2015    (WO) ............... PCT/CN2015/084363

(51) Int. Cl.
*H04W 72/04*  (2009.01)
*H04L 29/06*  (2006.01)
(Continued)

(52) U.S. Cl.
CPC ......... *H04W 72/0406* (2013.01); *H04L 69/22* (2013.01); *H04L 69/323* (2013.01);
(Continued)

(58) Field of Classification Search
CPC .......... H04W 72/0406; H04W 72/0446; H04L 69/22; H04L 69/323
See application file for complete search history.

(56) References Cited

U.S. PATENT DOCUMENTS

2003/0123405 A1    7/2003   Del Prado et al.
2007/0242621 A1   10/2007   Nandagopalan et al.
(Continued)

FOREIGN PATENT DOCUMENTS

| CN | 101421990 A | 4/2009 |
|----|-------------|--------|
| CN | 102685777 A | 9/2012 |

(Continued)

OTHER PUBLICATIONS

"IEEE Standard for Information technology—Telecommunications and information exchange between systems Local and metropolitan area networks—Specific requirements; Part 11:Wireless LAN Medium Access Control(MAC) and Physical Layer(PHY) Specifications," IEEE 802.11-2012, IEEE Computer Society, Institute of Electrical and Electronics Engineers, New York, New York (Mar. 29, 2012).

(Continued)

*Primary Examiner* — Ricky Q Ngo
*Assistant Examiner* — Stephen N Steiner
(74) *Attorney, Agent, or Firm* — Leydig, Voit & Mayer, Ltd.

(57) ABSTRACT

The present disclosure provides a NAV (network allocation vector) setting method in a wireless communications system and a related device. The method includes: receiving, by a receiving node, a PPDU (physical layer protocol data unit) sent by a transmitting node; determining whether the receiving node satisfies a condition of allowing simultaneous transmission; and if the condition of allowing simultaneous transmission is satisfied, keeping a current NAV value unchanged; or if the condition of allowing simultaneous (Continued)

transmission is not satisfied, decoding the received PPDU to obtain a duration field, and updating the current NAV value of the receiving node according to a value of the duration field.

6 Claims, 6 Drawing Sheets

(51) Int. Cl.
    *H04L 29/08* (2006.01)
    *H04W 84/12* (2009.01)
    *H04W 16/14* (2009.01)
    *H04W 74/00* (2009.01)
    *H04W 74/08* (2009.01)

(52) U.S. Cl.
    CPC ........ *H04W 72/0446* (2013.01); *H04W 16/14* (2013.01); *H04W 74/008* (2013.01); *H04W 74/0816* (2013.01); *H04W 84/12* (2013.01)

(56) References Cited

U.S. PATENT DOCUMENTS

| | | |
|---|---|---|
| 2009/0059824 A1 | 3/2009 | Wentink |
| 2009/0279524 A1 | 11/2009 | Yu et al. |
| 2014/0112266 A1 | 4/2014 | Seok |
| 2015/0139083 A1 | 5/2015 | Kneckt et al. |
| 2016/0081100 A1 | 3/2016 | Du et al. |
| 2016/0242210 A1* | 8/2016 | Seok ..................... H04W 28/18 |
| 2016/0262054 A1* | 9/2016 | Singh ................ H04W 74/0808 |
| 2018/0343096 A1* | 11/2018 | Kim .................... H04W 52/243 |

FOREIGN PATENT DOCUMENTS

| | | |
|---|---|---|
| CN | 103428885 A | 12/2013 |
| CN | 103476130 A | 12/2013 |
| CN | 104184702 A | 12/2014 |
| CN | 104639289 A | 5/2015 |
| CN | 104756585 A | 7/2015 |
| WO | 2014190275 A1 | 11/2014 |
| WO | 2015050311 A1 | 4/2015 |

OTHER PUBLICATIONS

"IEEE Standard for Information technology—Telecommunications and information exchange between systems Local and metropolitan area networks—Specific requirements; Part 11:Wireless LAN Medium Access Control (MAC) and Physical Layer (PHY) Specifications, Amendment 5:Enhancements for Higher Throughput," IEEE Std 802.11n-2009, IEEE Computer Society, Institute of Electrical and Electronics Engineers, New York, New York (Oct. 29, 2009).

"IEEE Standard for Information technology—Telecommunications and information exchange between systems Local and metropolitan area networks—Specific requirements; Part 11: Wireless LAN Medium Access Control (MAC) and Physical Layer (PHY) Specifications Amendment 4: Enhancements for Very High Throughput for Operation in Bands below 6 GHz," IEEE Std 802.11ac™-2013, IEEE Computer Society, Institute of Electrical and Electronics Engineers, New York, New York (Approved Dec. 11, 2013).

* cited by examiner

NAV SETTING METHOD IN WIRELESS COMMUNICATIONS SYSTEM AND RELATED DEVICE

CROSS-REFERENCE TO RELATED APPLICATIONS

This application is a continuation of International Application No. PCT/CN2015/089002, filed on Sep. 6, 2015, which claims priority to International Application No. PCT/CN2015/084363, filed on Jul. 17, 2015. The disclosures of the aforementioned applications are hereby incorporated by reference in their entireties.

TECHNICAL FIELD

Embodiments of the present disclosure relate to the field of communications technologies, and more specifically, to a NAV setting method in a wireless communications system and a related device.

BACKGROUND

With development of mobile Internet and popularity of smart terminals, data traffic presents an explosive growth trend. Currently, a wireless local area network (WLAN) becomes one of mainstream mobile broadband access technologies with advantages of a high rate and low costs.

An 802.11ac-based wireless local area network (WLAN) system is briefly referred to as an 802.11ac system, and the 802.11ac system uses an orthogonal frequency division multiplexing (OFDM) modulation scheme. The 802.11ac system may include multiple basic service sets (BSS), and each BSS may include one access point (AP) and one station (STA) associated with the AP. When the AP or the STA needs to transmit data, the AP or the STA may detect signal detection energy of a current channel. If the signal detection energy is less than a clear channel assessment (CCA) threshold, the AP or the STA contends for the channel, and transmits the data when the channel contention succeeds.

A next-generation WLAN system 802.11ax may introduce a spatial reuse technology to improve use efficiency of system resources. An AP or a STA may increase a CCA threshold. In this way, spatial simultaneous transmission can be performed on a link on which simultaneous transmission cannot be performed originally, thereby enhancing a network throughput.

In an 802.11n/ac system, a NAV (network allocation vector) setting manner is as follows: After receiving a data packet, a node determines whether a receiver address of the data packet is the node. If the receiver address of the data packet is not the node, the node determines a relationship between a decoded duration field and a current NAV. If the field is greater than a current NAV value, the node updates the NAV.

Due to the introduced spatial reuse technology, if the CCA threshold is increased, it indicates that the system supports that the node performs spatial reuse. However, if the node determines that a current CCA is idle, according to an original NAV mechanism, the node needs to update the NAV according to the decoded duration field, and the node still cannot perform spatial reuse. Consequently, enhancing a system throughput is affected.

SUMMARY

Embodiments of the present disclosure provide a NAV setting method in a wireless communications system and a related device, so as to enhance a system throughput.

A first aspect of the present disclosure provides a NAV setting method in a wireless communications system, and the method includes: receiving, by a receiving node, a physical layer protocol data unit (PPDU) sent by a transmitting node; determining whether the receiving node satisfies a condition of allowing simultaneous transmission; and if the condition of allowing simultaneous transmission is satisfied, keeping a current NAV value unchanged; or if the condition of allowing simultaneous transmission is not satisfied, decoding the received PPDU to obtain a duration field, and updating the current NAV value of the receiving node according to a value of the duration field.

Specifically, the condition of allowing simultaneous transmission includes at least one or a combination of the following conditions: a current CCA threshold of the receiving node is set to be greater than a preset value, the node detects that an received signal strength index (RSSI) of the received PPDU is less than or equal to a CCA threshold or an increased CCA threshold or the node is in a CCA idle state, the receiving node is located in a nearby area of an AP in an intra-BSS, the received PPDU indicates that another node is allowed to perform simultaneous transmission, or the like.

Specifically, whether the PPDU received by the receiving node indicates that other nodes except the transmitting node are allowed to perform simultaneous transmission includes:

in a PPDU in an 802.11ax format, a one-bit "SR allowed flag" may be added into HE-SIGA, or a common part of HE-SIGB, or a MAC header part, to indicate whether other nodes except the transmitting node are allowed to perform simultaneous transmission; and/or in a PPDU in a Legacy format, a one-bit "SR allowed flag" may be added into a MAC header field, to indicate whether other nodes except the transmitting node are allowed to perform simultaneous transmission.

Specifically, the PPDU in an 802.11ax format includes a data frame, a control frame such as RTS, CTS, or Trigger Frame, or a management frame; and the PPDU in a Legacy format includes a control frame such as RTS, CTS, or Trigger Frame, or a management frame.

Specifically, a specific updating method for updating the current NAV value of the receiving node according to the value of the duration field may be: determining whether the value of the duration field is greater than the current NAV, and updating the current NAV if the value of the duration field is greater than the current NAV, or skipping updating the current NAV if the value of the duration field is not greater than the current NAV; or setting the NAV value of the node by using the value of the duration field; or another method.

Specifically, the clear channel assessment (CCA) threshold is a preamble detection/signal detection threshold, an energy detection threshold, a WiFi signal detection threshold, or the like.

Specifically, the preset value may be a minimum or preset preamble detection or signal detection threshold; or may be a preset or minimum energy detection threshold; or may be a preset or minimum WiFi signal detection threshold; or may be another preset threshold.

Specifically, the PPDU received by the receiving node is from an overlapping BSS (OBSS) or intra-BSS of a WLAN system.

A second aspect of the present disclosure provides a communications node, and the communications node includes: a receiver, configured to receive a PPDU sent by a transmitting node; and a processor, configured to: determine whether the communications node satisfies a condition of allowing simultaneous transmission; and if the condition of allowing simultaneous transmission is satisfied, keep a current NAV value unchanged; or if the condition of allowing simultaneous transmission is not satisfied, decode the received PPDU to obtain a duration field, and update the current NAV value of the communications node according to a value of the duration field.

Specifically, the condition of allowing simultaneous transmission includes at least one or a combination of the following conditions: a current CCA threshold of the communications node is set to be greater than a preset value, the node detects that an RSSI of the received PPDU is less than or equal to a CCA threshold or an increased CCA threshold or the node is in a CCA idle state, the communications node is located in a nearby area of an AP in an intra-BSS, the received PPDU indicates that another node is allowed to perform simultaneous transmission, or the like.

Specifically, whether the PPDU received by the communications node indicates other nodes except the transmitting node are allowed to perform simultaneous transmission includes:

in a PPDU in an 802.11ax format, a one-bit "SR allowed flag" may be added into HE-SIGA, or a common part of HE-SIGB, or a MAC header part, to indicate whether other nodes except the transmitting node are allowed to perform simultaneous transmission; and/or in a PPDU in a Legacy format, a one-bit "SR allowed flag" may be added into a MAC header field, to indicate whether other nodes except the transmitting node are allowed to perform simultaneous transmission.

Specifically, the PPDU in an 802.11ax format includes a data frame, a control frame such as RTS, CTS, or Trigger Frame, or a management frame; and the PPDU in a Legacy format includes a control frame such as RTS, CTS, or Trigger Frame, or a management frame.

Specifically, when updating the current NAV value of the communications node according to the value of the duration field, the processor is specifically configured to: determine whether the value of the duration field is greater than the current NAV, and update the current NAV if the value of the duration field is greater than the current NAV, or skip updating the current NAV if the value of the duration field is not greater than the current NAV; or set the NAV value of the node by using the value of the duration field, or use another method.

Specifically, the clear channel assessment (CCA) threshold is a preamble detection or signal detection threshold, an energy detection threshold, a WiFi signal detection threshold, or the like.

Specifically, the preset value may be a minimum or preset preamble detection or signal detection threshold; or may be a preset or minimum energy detection threshold; or may be a preset or minimum WiFi signal detection threshold; or may be another preset threshold.

Specifically, the PPDU received by the communications node is from an OBSS or intra-BSS of a WLAN system.

A third aspect of the present disclosure provides a NAV setting method in a wireless communications system, and the method includes: receiving, by a receiving node, a PPDU sent by a transmitting node; determining, by the receiving node, whether a condition of not updating a NAV is satisfied; and if the condition of not updating a NAV is satisfied, skipping updating a NAV; or if the condition of not updating a NAV is not satisfied, decoding, by the receiving node, the received PPDU to obtain a duration field, and updating a current NAV value of the receiving node according to a value of the duration field.

Specifically, the condition of not updating a NAV includes any one or a combination of the following conditions: the received PPDU includes an address of the receiving node itself, the received PPDU is an 802.11ax PPDU, a receiver address of RTS or CTS received by the receiving node includes an address of the receiving node, or the like.

Specifically, the PPDU received by the receiving node may be an 802.11ax PPDU or a legacy PPDU.

Specifically, the PPDU received by the receiving node may be a PPDU from an intra-BSS of a WLAN system.

Specifically, a specific method for updating the current NAV value of the receiving node according to the value of the duration field may be: determining whether the value of the duration field is greater than the current NAV, and updating the current NAV if the value of the duration field is greater than the current NAV, or skipping updating the current NAV if the value of the duration field is not greater than the current NAV; or setting the NAV value of the node by using the value of the duration field.

A fourth aspect of the present disclosure provides a communications node, and the communications node includes: a receiver, configured to receive a PPDU sent by a transmitting node; and a processor, configured to: determine whether a condition of not updating a NAV is satisfied; and if the condition of not updating a NAV is satisfied, skip updating the NAV; or if the condition of not updating a NAV is not satisfied, decode, by the communications node, the received PPDU to obtain a duration field, and update a current NAV value of the communications node according to a value of the duration field.

Specifically, the condition of not updating a NAV includes any one or a combination of the following conditions: the received PPDU includes an address of the communications node itself, the received PPDU is an 802.11ax PPDU frame, a receiver address of RTS or CTS received by the communications node includes an address of the communications node, or the like.

Specifically, the PPDU received by the communications node may be an 802.11ax PPDU or a legacy PPDU.

Specifically, the PPDU received by the communications node may be a PPDU from an intra-BSS of a WLAN system.

Specifically, when updating the current NAV value of the communications node according to the value of the duration field, the processor is specifically configured to: determine whether the value of the duration field is greater than the current NAV, and update the current NAV if the value of the duration field is greater than the current NAV, or skip updating the current NAV if the value of the duration field is not greater than the current NAV; or set the NAV value of the node by using the value of the duration field.

The present disclosure mainly designs a NAV mechanism for spatial reuse, so as to increase a spatial reuse capability of a system, and enhance a throughput of an entire network.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
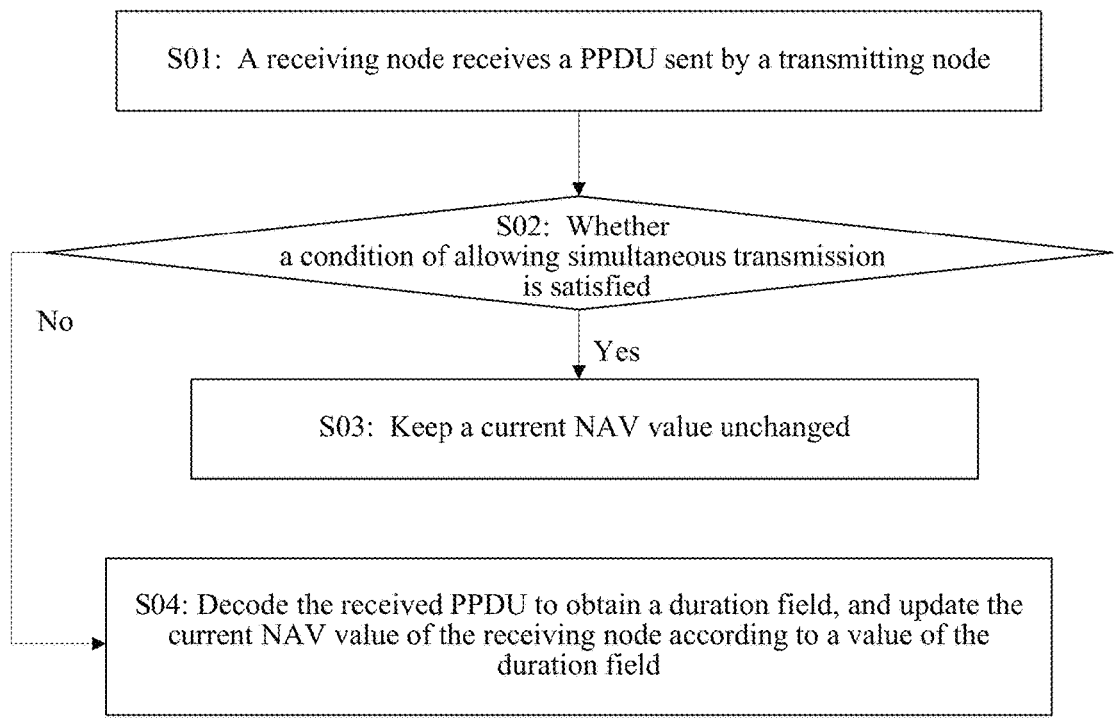
FIG. 1 is a flowchart of a NAV setting method in a wireless communications system according to Embodiment 8 of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure may be applied to a wireless local area network (WLAN). The WLAN may include multiple basic service sets (BSSs). A network node of the BSS is a station (STA), and the station includes an access point station (AP) and a none access point station (Non-AP STA). Each BSS may include one AP and multiple Non-AP STAs associated with the AP. A manner of uplink transmission between an AP and a STA includes but is not limited to an OFDMA manner.

The AP is also referred to as a wireless access point, a hotspot, or the like. The AP is an access point for a mobile user to connect to a wired network, and is mainly deployed inside a home, a building, or a campus. A typical coverage radius ranges from dozens of meters to hundreds of meters. Certainly, the AP may be deployed outdoors. The AP functions as a bridge connecting a wired network and a wireless network. A main function of the AP is to connect clients of a wireless network together, and then to connect the wireless network to Ethernet. Currently, a major standard used by the AP is an IEEE (Institute of Electrical and Electronics Engineers) 802.11 series. Specifically, the AP may be a terminal device or a network device having a WiFi (Wireless Fidelity) chip. Optionally, the AP may be a device supporting an 802.11ax standard. Further, optionally, the AP may be a device supporting multiple WLAN standards such as 802.11ac, 802.11n, 802.11g, 802.11b, and 802.11a.

The Non-AP STA, briefly referred to as STA below, may be a wireless communications chip, a wireless sensor, or a wireless communications terminal, for example, a mobile phone supporting a WiFi communication function, a tablet computer supporting a WiFi communication function, a set-top box supporting a WiFi communication function, a smart television supporting a WiFi communication function, a smart wearable device supporting a WiFi communication function, or a computer supporting a WiFi communication function. Optionally, the STA may support an 802.11ax standard. Further, optionally, the STA may support multiple WLAN standards such as 802.11ac, 802.11n, 802.11g, 802.11b, and 802.11a.

Embodiment 1

In Embodiment 1 of the present disclosure, an access point or a station determines that a received 802.11ax physical layer protocol data unit (PPDU) is from a WLAN overlapping basic service set (OBSS). If a current clear channel assessment (CCA) threshold of the access point or the station is set to be greater than a preset value, the access point or the station keeps a current NAV value not updated; or when a current clear channel assessment (CCA) threshold of the access point or the station is set to be greater than a preset value, and the node (the access point or the station) detects that an RSSI (received signal strength indicator) of the received PPDU is less than or equal to a CCA threshold or an increased CCA threshold or the node is in a CCA idle state, the access point or the station keeps a current NAV value not updated.

The 802.11ax PPDU may include a data frame, or may include a control frame (for example, (e)RTS/(e)CTS/Trigger Frame), a management frame, or the like.

Whether the 802.11ax PPDU is from the OBSS may be determined according to a BSS color field in HE-SIGA, or according to a receiver address (RA) or a transmitter address (TA) of a MAC header, or by using another method.

The clear channel assessment (CCA) threshold may be a preamble detection/signal detection threshold, an energy detection threshold, or a WiFi signal detection threshold.

The preset value may be a preset or minimum preamble detection/signal detection threshold (for example, may be −82 dBm by default in a system bandwidth of 20 MHz, or may be −79 dBm by default in a system bandwidth of 40 MHz), and may be specifically a threshold used when a signal preamble is obtained by means of decoding; or may be a preset or minimum energy detection threshold (for example, may be −62 dBm by default in a system bandwidth of 20 MHz), and may be specifically a threshold used when a signal or a signal preamble cannot be obtained by means of decoding; or may be a preset or minimum WiFi signal detection threshold (for example, may be −72 dBm by default in a system bandwidth of 20 MHz), and may be specifically a threshold used when a signal preamble cannot be obtained by means of decoding but a WiFi or 802.11ax signal can be determined; or may be another preset threshold.

Embodiment 2

In Embodiment 2 of the present disclosure, an access point or a station determines that a received 802.11ax physical layer protocol data unit (PPDU) is from a WLAN overlapping basic service set (OBSS). If a current clear channel assessment (CCA) threshold is equal to or less than a preset value, after decoding the 11ax PPDU of the OBSS to obtain a duration field, the node updates a current NAV value of the node according to value information of the field.

The duration field obtained by means of decoding may be information about a duration field of a MAC header in the PPDU, information about a duration field in HE-SIGA, or the like.

A method for updating the current NAV value of the node according to the value information of the duration field may be: determining whether the value of the duration field is greater than the current NAV, and updating the current NAV if the value of the duration field is greater than the current NAV, or skipping updating the current NAV if the value of the duration field is not greater than the current NAV; or setting the NAV value of the node by using the value of the duration field; or another specified updating method.

Embodiment 3

In Embodiment 3 of the present disclosure, an access point or a station determines that a received legacy PPDU is from a WLAN OBSS, the access point or the station decodes the legacy PPDU of the OBSS to obtain a duration field, and updates a current NAV value of the node according to value information of the field. A specific updating method may be similar to the method, described in Embodiment 2, for updating the NAV value according to the duration field.

The access point or the station determines that the received legacy PPDU is from the WLAN overlapping basic service set (OBSS). If a current clear channel assessment (CCA) threshold of the access point or the station is set to be greater than a preset value, the access point or the station keeps the current NAV value not updated; or when a current clear channel assessment (CCA) threshold of the access point or the station is set to be greater than a preset value, and the node (the access point or the station) detects that an RSSI (received signal strength indicator) of the received PPDU is less than or equal to an increased CCA threshold or the node is in a CCA idle state, the access point or the station keeps the current NAV value not updated.

The access point or the station determines that the received legacy PPDU is from the WLAN overlapping basic service set (OBSS), and if the current clear channel assessment (CCA) threshold of the access point or the station is less than or equal to a preset value, after the node decodes the legacy PPDU of the OBSS to obtain the duration field, the access point or the station updates the current NAV value of the node according to the value information of the field.

Embodiment 4

In Embodiment 4 of the present disclosure, after a node (an access point or a station) receives any PPDU (for example, an 11ax or legacy data frame, control frame, or management frame) from an intra basic service set (intra-BSS), the node determines whether a receiver address of the PPDU is an address of the node itself or includes an address of the node itself, and if the receiver address of the PPDU is the address of the node itself or includes the address of the node itself, the node keeps a current NAV value not updated.

After the node receives any PPDU (for example, an 11ax or legacy data frame, control frame, or management frame) from the intra basic service set (intra-BSS), the node determines whether the receiver address of the PPDU is the address of the node itself or includes the address of the node itself, and if the receiver address of the PPDU is not the address of the node itself or does not include the address of the node itself, after decoding the PPDU to obtain a duration field, the node updates the current NAV value of the node according to value information of the field.

Embodiment 5

In Embodiment 5 of the present disclosure, after a node (for example, an access point or a station) receives an 11ax PPDU from an intra basic service set (intra-BSS), the node keeps a current NAV value not updated.

After the node receives a legacy PPDU from the intra basic service set (intra-BSS), the node determines whether a receiver address of the PPDU is an address of the node itself or includes an address of the node itself, and if the receiver address of the PPDU is an address of the node itself or includes an address of the node itself, the node keeps a current NAV value not updated.

After the node receives the legacy PPDU from the intra basic service set (intra-BSS), the node determines whether the receiver address of the PPDU is the address of the node itself or includes the address of the node itself, and if the receiver address of the PPDU is not the address of the node itself or does not include the address of the node itself, after decoding the legacy PPDU to obtain a duration field, the node updates the current NAV value of the node according to value information of the field.

Embodiment 6

In Embodiment 6 of the present disclosure, after a node (for example, an access point or a station) receives an 11ax PPDU from an intra basic service set (intra-BSS), the node determines whether an address of the node is a receiver address of RTS or CTS, or is included in a receiver address of RTS or CTS, and if the address of the node is the receiver address of the RTS or CTS, or is included in the receiver address of the RTS or CTS, the node keeps a current NAV value not updated.

After the node receives the 11ax PPDU from the intra basic service set (intra-BSS), the node determines whether the address of the node is the receiver address of the RTS or CTS, or is included in the receiver address of the RTS or CTS, and if the address of the node is not the receiver address of the RTS or CTS, or is not included in the receiver address of the RTS or CTS, after decoding the 11ax PPDU to obtain a duration field, the node updates the current NAV value of the node according to value information of the field.

After the node receives a legacy PPDU from the intra basic service set (intra-BSS), the node determines whether a receiver address of the PPDU is an address of the node itself or includes an address of the node itself, and if the receiver address of the PPDU is an address of the node itself or includes an address of the node itself, the node keeps a current NAV value not updated.

After the node receives the legacy PPDU from the intra basic service set (intra-BSS), the node determines whether the receiver address of the PPDU is the address of the node itself or includes the address of the node itself, and if the receiver address of the PPDU is not the address of the node itself or does not include the address of the node itself, after decoding the legacy PPDU to obtain a duration field, the node updates the current NAV value of the node according to value information of the field.

Embodiment 7

Embodiment 7 of the present disclosure describes that after a node receives any PPDU (for example, an 11ax or legacy data frame, control frame, or management frame) from an intra basic service set (intra-BSS), the node determines whether an address of the node is a receiver address of RTS or CTS, or is included in a receiver address of RTS or CTS, and if the address of the node is the receiver address of the RTS or CTS, or is included in the receiver address of the RTS or CTS, the node keeps a current NAV value not updated.

After the node receives any PPDU (for example, an 11 ax or legacy data frame, control frame, or management frame) from the intra basic service set (intra-BSS), the node determines whether the address of the node is the receiver address of the RTS or CTS, or is included in the receiver address of the RTS or CTS, and if the address of the node is not the receiver address of the RTS or CTS, or is not included in the receiver address of the RTS or CTS, after decoding the 11ax PPDU to obtain a duration field, the node updates the current NAV value of the node according to value information of the field.

The present disclosure mainly designs a NAV mechanism for spatial reuse, so as to increase a spatial reuse capability of a system, and enhance a throughput of an entire network.

Embodiment 8

As shown in FIG. 1, with reference to one or more of Embodiment 1 to Embodiment 7, Embodiment 8 of the present disclosure provides a NAV setting method in a wireless communications system. The method includes the following steps:

S01: A receiving node receives a PPDU sent by a transmitting node, where the PPDU may be an 802.11ax PPDU or a legacy PPDU, and may be a PPDU from an OBSS or intra-BSS of a WLAN system.

S02: Determine whether the receiving node satisfies a condition of allowing simultaneous transmission.

S03: If the condition of allowing simultaneous transmission is satisfied, keep a current NAV value unchanged.

S04: If the condition of allowing simultaneous transmission is not satisfied, decode the received PPDU to obtain a duration field, and update the current NAV value of the receiving node according to a value of the duration field.

The condition of allowing simultaneous transmission includes at least one or a combination of the following conditions: a current CCA threshold of the receiving node is set to be greater than a preset value, the node detects that an RSSI of the received PPDU is less than or equal to a CCA threshold or an increased CCA threshold or the node is in a CCA idle state, the receiving node is located in a nearby area of an AP in an intra-BSS, the received PPDU indicates that another node is allowed to perform simultaneous transmission, or the like.

Whether the receiving node is in a nearby area of an AP in an intra-BSS specifically includes the following scenarios:

if an RSSI of a received PPDU of the AP (an AP located in a same BSS as the receiving node) in the intra-BSS is greater than or equal to a preset value, it is determined that the receiving node is located in the nearby area of the AP in the intra-BSS; or if a distance between the receiving node and the AP is less than or equal to a preset value, it is determined that the receiving node is located in the nearby area of the AP in the intra-BSS; or another method is used.

Whether the PPDU received by the receiving node indicates that other nodes except the transmitting node are allowed to perform simultaneous transmission specifically includes the following scenarios:

in a PPDU (including a data frame, a control frame such as RTS, CTS, or Trigger Frame, or a management frame) in an 802.11ax format, a one-bit "SR allowed flag" or an n-bit (n is an integer greater than one) "SR allowed flag" may be added into HE-SIGA andor a common part of SIGB, or a MAC header part, or a special value (for example, all-zero or another special value) of a Spatial Reuse field (SR field) for simultaneous transmission (for example, an interference level interference level or interference margin interference margin) may be added, to indicate whether another node is allowed to perform simultaneous transmission; and/or in a PPDU (for example, a control frame such as RTS, CTS, or Trigger Frame, or a management frame) in a Legacy format, a one-bit "SR allowed flag" or an n-bit (n is an integer greater than one) "SR allowed flag" may be added into a MAC header field, or a special value (for example, all-zero or another special value) of a Spatial Reuse field (SR field) for simultaneous transmission (for example, an interference level interference level or interference margin interference margin) may be added, to indicate whether another node is allowed to perform simultaneous transmission.

Figure 2:
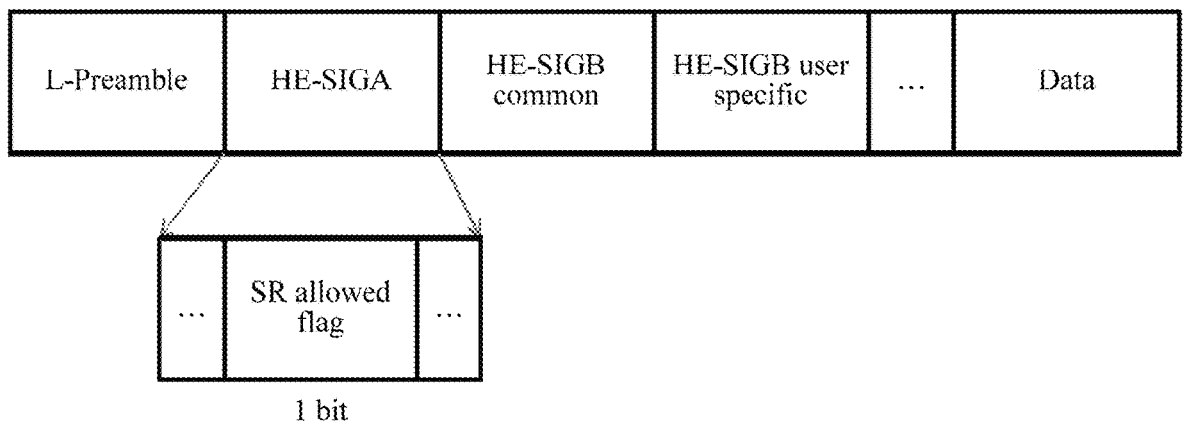
FIG. 2 to FIG. 4 are schematic structural diagrams of different PPDU frames in an 802.11ax format according to Embodiment 8 of the present disclosure.
Figure 3:
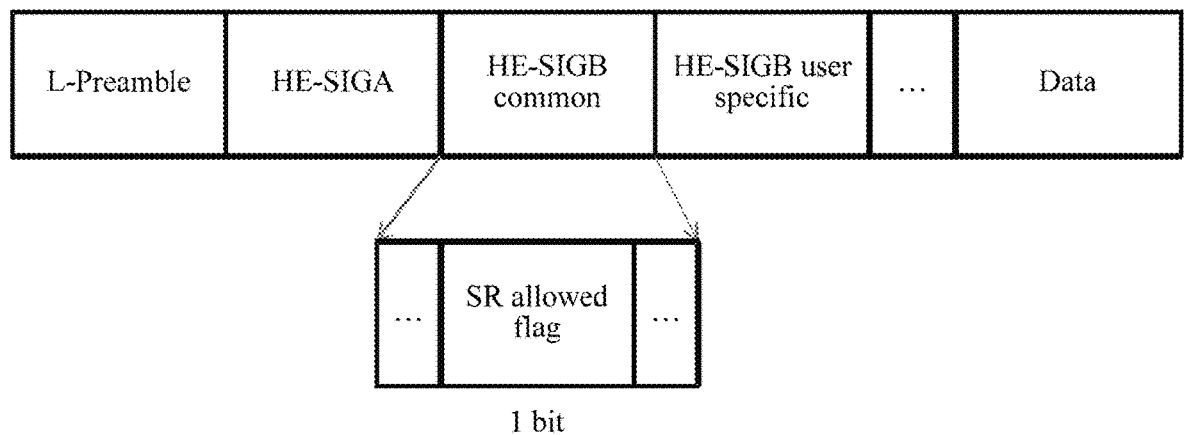
Figure 4:
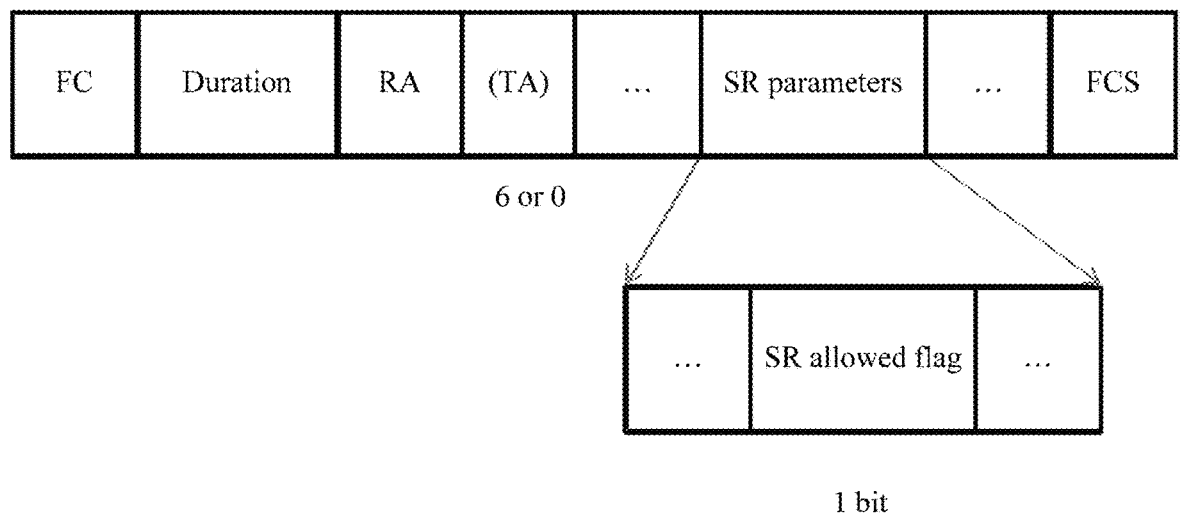

For a specific location of the "SR allowed flag" in the PPDU, refer to FIG. 2 to FIG. 4.

In step S04, a specific method for updating the current NAV value of the receiving node according to the value of the duration field may be: determining whether the value of the duration field is greater than the current NAV, and updating the current NAV if the value of the duration field is greater than the current NAV, or skipping updating the current NAV if the value of the duration field is not greater than the current NAV; or setting the NAV value of the node by using the value of the duration field; or another specified updating method.

The clear channel assessment (CCA) threshold may be a preamble detection/signal detection threshold, an energy detection threshold, or a WiFi signal detection threshold.

The preset value may be a preset or minimum preamble detection/signal detection threshold (for example, may be −82 dBm by default in a system bandwidth of 20 MHz, or may be −79 dBm by default in a system bandwidth of 40 MHz), and may be specifically a threshold used when a signal preamble is obtained by means of decoding; or may be a preset or minimum energy detection threshold (for example, may be −62 dBm by default in a system bandwidth of 20 MHz), and may be specifically a threshold used when a signal or a signal preamble cannot be obtained by means of decoding; or may be a preset or minimum WiFi signal detection threshold (for example, may be −72 dBm by default in a system bandwidth of 20 MHz), and may be specifically a threshold used when a signal preamble cannot be obtained by means of decoding but a WiFi or 802.11ax signal can be determined; or may be another preset threshold.

Figure 5:
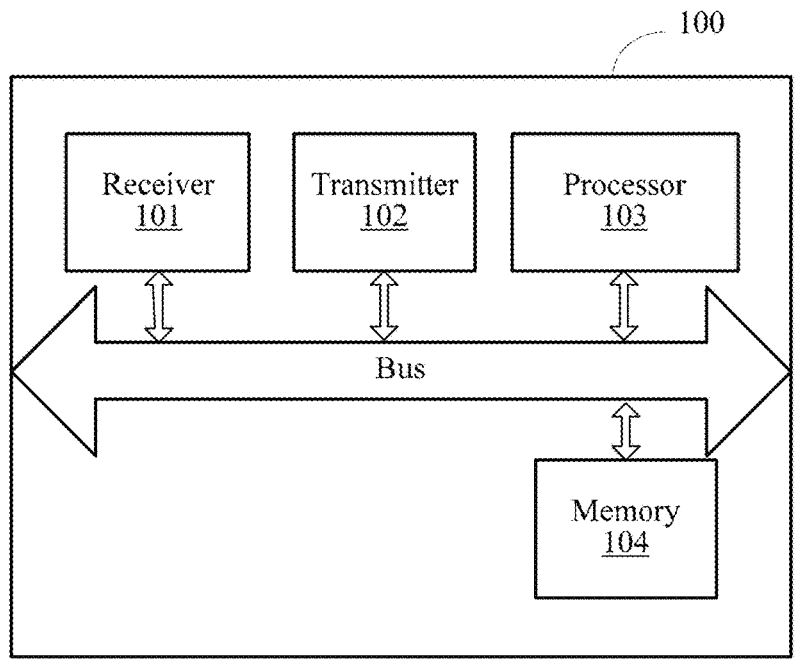
FIG. 5 is a structural diagram of a communications node according to Embodiment 8 of the present disclosure.

Referring to FIG. 5, Embodiment 8 of the present disclosure further provides a communications node 100 including a receiver 101, a transmitter 102, a processor 103, and a memory 104.

The receiver 101 is configured to receive a PPDU in an OBSS or intra-BSS of a WLAN system, where the PPDU may be an 802.11ax PPDU or a legacy PPDU.

The processor 103 is configured to: determine whether the communications node 100 satisfies a condition of allowing simultaneous transmission; and if the condition of allowing simultaneous transmission is satisfied, keep a current NAV value unchanged; or if the condition of allowing simultaneous transmission is not satisfied, decode the received PPDU to obtain a duration field, and update the current NAV value of the receiving node according to a value of the duration field.

The condition of allowing simultaneous transmission includes at least one or a combination of the following conditions: a current CCA threshold of the communications node 100 is set to be greater than a preset value, the communications node 100 is in a nearby area of an AP in an intra-BSS, the communications node detects that an RSSI of the received PPDU is less than or equal to a CCA threshold or an increased CCA threshold or the node is in a CCA idle state, the received PPDU indicates that another node is allowed to perform simultaneous transmission, or the like.

In Embodiment 8 of the present disclosure, the processor 103 may be configured to execute step S02 to step S04, and the memory 104 is configured to store a program and data that are required for the processor 103 to execute the foregoing steps.

Embodiment 9

Figure 6:
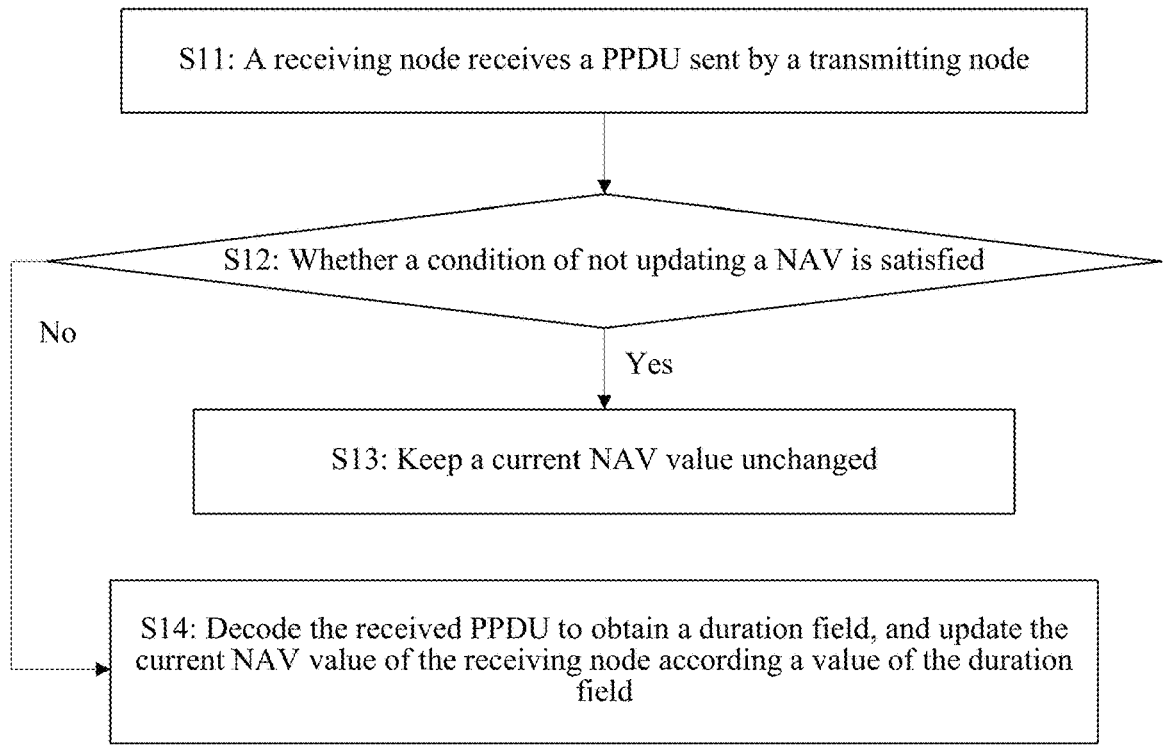
FIG. 6 is a flowchart of a NAV setting method in a wireless communications system according to Embodiment 9 of the present disclosure.

As shown in FIG. 6, with reference to one or more of Embodiment 1 to Embodiment 7, Embodiment 9 of the present disclosure provides a NAV setting method in a wireless communications system. The method includes the following steps:

S11: A receiving node receives a PPDU sent by a transmitting node, where the PPDU may be an 802.11ax PPDU or a legacy PPDU, and may be a PPDU from an intra-BSS of a WLAN system.

S12: The receiving node determines whether a condition of not updating a NAV is satisfied.

S13: If the condition of not updating a NAV is satisfied, skip updating a NAV, where the condition of not updating a NAV includes any one or a combination of the following conditions: the received PPDU includes an address of the receiving node itself, the received PPDU is an 802.11ax PPDU, a receiver address of RTS or CTS received by the receiving node includes an address of the receiving node, or the like.

S14: If the condition of not updating a NAV is not satisfied, the receiving node decodes the received PPDU to obtain a duration field, and updates a current NAV value of the receiving node according to a value of the duration field.

In step S14, a specific method for updating the current NAV value of the receiving node according to the value of the duration field may be: determining whether the value of the duration field is greater than the current NAV, and updating the current NAV if the value of the duration field is greater than the current NAV, or skipping updating the current NAV if the value of the duration field is not greater than the current NAV; or setting the NAV value of the node by using the value of the duration field; or another specified updating method.

The 802.11ax PPDU may include a data frame, or may include a control frame (for example, (e)RTS/(e)CTS/Trigger Frame), a management frame, or the like.

Figure 7:
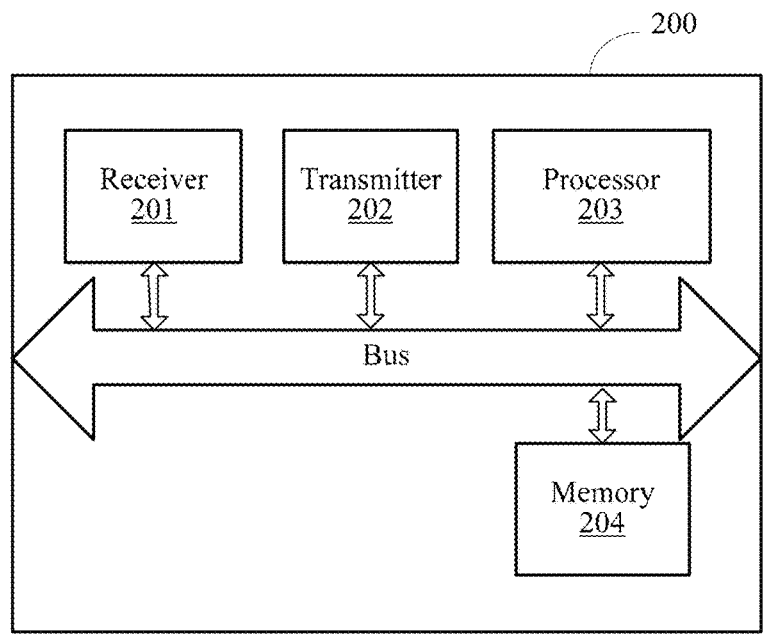
FIG. 7 is a structural diagram of a communications node according to Embodiment 9 of the present disclosure.

Referring to FIG. 7, Embodiment 9 of the present disclosure further provides a communications node 200 including a receiver 201, a transmitter 202, a processor 203, and a memory 204.

The receiver 201 is configured to receive a PPDU sent by a transmitting node, where the PPDU may be an 802.11ax PPDU or a legacy PPDU, and may be a PPDU from an intra-BSS of a WLAN system.

The processor 203 is configured to: determine whether the communications node 200 satisfies a condition of not updating a NAV, where the condition of not updating a NAV includes any one or a combination of the following conditions: the received PPDU includes an address of the communications node itself, the received PPDU is an 802.11ax PPDU, a receiver address of RTS or CTS received by the communications node includes an address of the communications node, or the like; and if the condition of not updating a NAV is not satisfied, decode, by the communications node, the received PPDU to obtain a duration field, and update a current NAV value of the communications node according to a value of the duration field.

A specific method for updating the current NAV value of the receiving node according to the value of the duration field may be: determining whether the value of the duration field is greater than the current NAV, and updating the current NAV if the value of the duration field is greater than the current NAV, or skipping updating the current NAV if the value of the duration field is not greater than the current NAV; or setting the NAV value of the node by using the value of the duration field; or another specified updating method.

In Embodiment 9 of the present disclosure, the processor 203 may be configured to execute step S12 to step S14, and the memory 204 is configured to store a program and data that are required for the processor 203 to execute the foregoing steps.

Embodiment 10

In Embodiment 10 of the present disclosure, when a current NAV value of a station is set according to an 802.11ax PPDU sent by a node (an access point or a station) in an intra basic service set (intra-BSS), after receiving a trigger frame including uplink scheduling information of the station, the station does not consider the current NAV value as a condition for determining whether to send an uplink data frame. The 802.11ax PPDU sent by the node in the intra-BSS includes: a trigger frame, a downlink data frame, an acknowledgement frame (such as ACK/BA), a request frame, or a response frame sent by the access point, or an uplink data frame, an acknowledgement frame (such as ACK/BA), a response frame, or a request frame sent by the station, or the like.

Alternatively, when a current NAV value of a station is set according to an 802.11ax PPDU sent by a node in an intra-BSS, and the station does not receive a request frame/response frame (including a case in which no RTS/CTS is exchanged between the station and another node, or a case in which the station does not receive RTS/CTS due to transmission), after receiving a trigger frame including uplink scheduling information of the station, the station does not consider the current NAV value when determining whether to send an uplink data frame. The 802.11ax PPDU sent by the node in the intra-BSS includes: a trigger frame, a downlink data frame, or an acknowledgement frame (such as ACK/BA) sent by an access point, or an uplink data frame or an acknowledgement frame (such as ACK/BA) sent by a station.

The request frame may be RTS (request to send) in an existing format, a multi-user request to send frame MU-RTS, an enhanced request to send frame e-RTS, a simultaneous request to send frame simultaneous RTS, or the like.

The response frame may be CTS (Clear To Send) frame in an existing format, a multi-user clear to send frame MU-CTS, an enhanced clear to send frame e-CTS, a simultaneous clear to send frame simultaneous CTS, or the like.

Not considering the current NAV value may be specifically: skipping determining the NAV value, setting the NAV value to zero, or the like.

Optionally, the condition for determining whether to send an uplink data frame may further include: performing clear channel assessment (CCA) on a current channel by using a CCA threshold (for example, an OBSS PD level value). When the clear channel assessment is busy, an uplink data frame is not sent.

Figure 8:
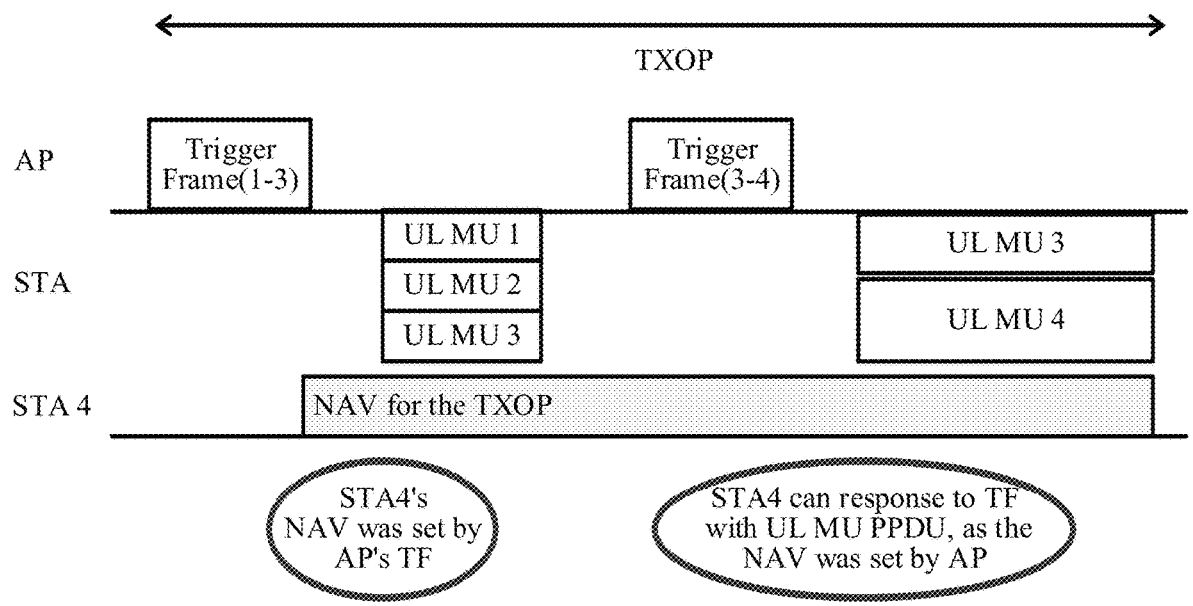
FIG. 8 to FIG. 11 are signaling flowcharts of different application scenarios according to the present disclosure.

As shown in FIG. 8, a NAV is set for a STA 4 according to a trigger frame sent by an AP in an intra-BSS. When the AP sends a trigger frame to the STA 4 to perform uplink scheduling, the STA 4 may not consider the NAV when sending a UL MU PPDU.

Figure 9:
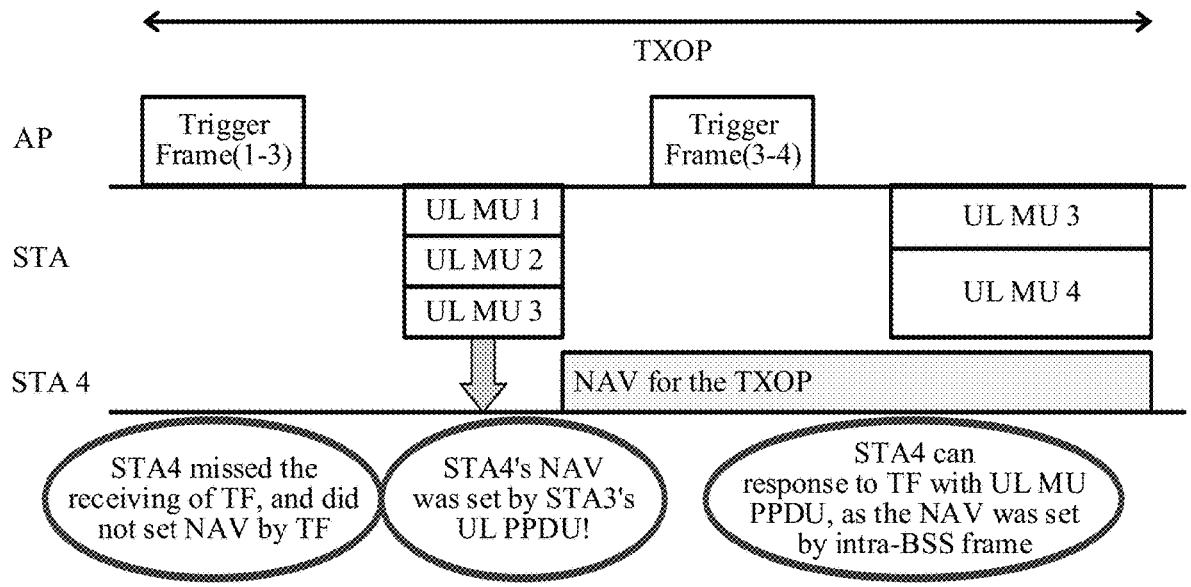

As shown in FIG. 9, a STA 4 does not correctly receive the first trigger frame sent by an AP in an intra-BSS, but correctly receives a UL MU PDDU sent by a nearby STA 3, and sets the NAV accordingly. When the AP sends a trigger frame to the STA 4 to perform uplink scheduling, the STA 4 may not consider the NAV when sending a UL MU PPDU.

Embodiment 11

In Embodiment 11 of the present disclosure, when a station already responds with a response frame (for example, CTS, MU-CTS, e-CTS, or simultaneous CTS) after receiving a request frame, after receiving a trigger frame including uplink scheduling information of the station, the station does not consider a current NAV value as a condition for determining whether to send an uplink data frame.

A specific method for not considering the current NAV value may be: skipping determining the NAV value, setting the NAV value to zero, or the like.

Optionally, the condition for determining whether to send an uplink data frame may further include: performing clear channel assessment (CCA) on a current channel by using a CCA threshold (for example, an OBSS PD level value). When the clear channel assessment is busy, an uplink data frame is not sent.

Embodiment 12

In Embodiment 12 of the present disclosure, when a station does not respond with a response frame (for example, CTS, MU-CTS, e-CTS, or simultaneous CTS), after receiving a trigger frame including uplink scheduling information of the station, the station considers a current NAV value as a condition for determining whether to send an uplink data frame (for example, if the current value is not zero, the station does not perform channel contention or transmission). That the station does not respond with a response frame may be that because the station does not receive a request frame, the station does not respond with a response frame, or that the station receives a request frame, but does not respond with a response frame.

Optionally, the condition for determining whether to send an uplink data frame may further include: performing clear channel assessment (CCA) on a current channel by using a CCA threshold (for example, an OBSS PD level value). When the clear channel assessment is busy, an uplink data frame is not sent.

In Embodiment 12 of the present disclosure, when a station does not respond with a response frame (for example, CTS, MU-CTS, e-CTS, or simultaneous CTS), after receiving a trigger frame including uplink scheduling information of the station, the station considers a current NAV value as a condition for determining whether to send an uplink data frame. That the station does not respond with a response frame may be that the station receives RTS, but does not respond with CTS.

Embodiment 13

In Embodiment 13 of the present disclosure, when a current NAV value of a station is set according to an 802.11ax PPDU sent by a node (an access point or a station) in an intra basic service set (intra-BSS), and the station responds with a response frame (for example, CTS, MU-CTS, e-CTS, or simultaneous CTS), after receiving a trigger frame including uplink scheduling information of the station, the station does not consider the current NAV value as a condition for determining whether to send an uplink data frame. The 802.11ax PPDU sent by the node in the intra-BSS includes: a trigger frame, a downlink data frame, or an acknowledgement frame (such as ACK/BA) sent by an access point, or an uplink data frame sent by a station.

Not considering the current NAV value may be specifically: skipping determining the NAV value, setting the NAV value to zero, or the like.

Optionally, the condition for determining whether to send an uplink data frame may include: performing clear channel assessment (CCA) on a current channel by using a CCA threshold (for example, an OBSS PD level value). When the clear channel assessment is busy, an uplink data frame is not sent.

Figure 10:
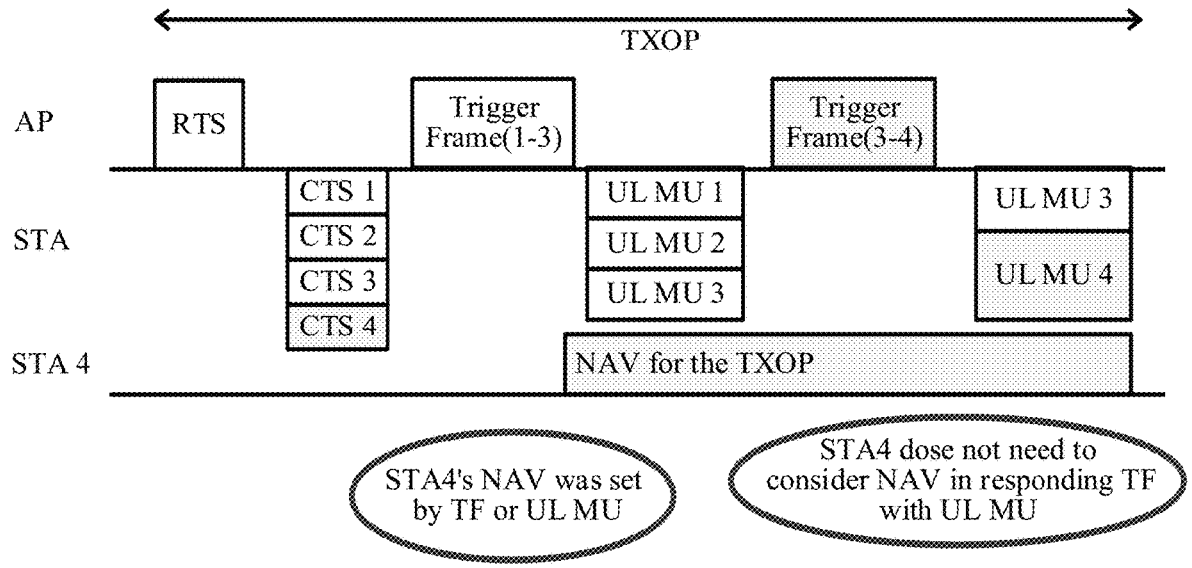

As shown in FIG. 10, a NAV of a STA 4 is set according to the first trigger frame (there is no uplink scheduling of the STA 4) sent by an AP in an intra-BSS. If the STA 4 already responds with simultaneous CTS, when receiving a trigger frame for uplink scheduling of the STA 4 in a transmission opportunity (TXOP), the STA 4 may not consider the NAV when sending a UL MU PPDU.

Embodiment 14

In Embodiment 14 of the present disclosure, when a current NAV value of a station is set according to an 802.11ax PPDU sent by a node (an access point or a station) in an intra basic service set (intra-BSS), and the station does not respond with a response frame (for example, CTS, MU-CTS, e-CTS, or simultaneous CTS), after receiving a trigger frame including uplink scheduling information of the station, the station considers the current NAV value as a condition for determining whether to send an uplink data frame (for example, if the current NAV value is not zero, the station does not perform channel contention or transmission). The 802.11ax PPDU sent by the node in the intra-BSS includes: a trigger frame, a downlink data frame, or an acknowledgement frame (such as ACK/BA) sent by the access point, or an uplink data frame sent by the station.

Optionally, the condition for determining whether to send an uplink data frame may include: performing clear channel assessment (CCA) on a current channel by using a CCA threshold (for example, an OBSS PD level value). When the clear channel assessment is busy, an uplink data frame is not sent.

Figure 11:
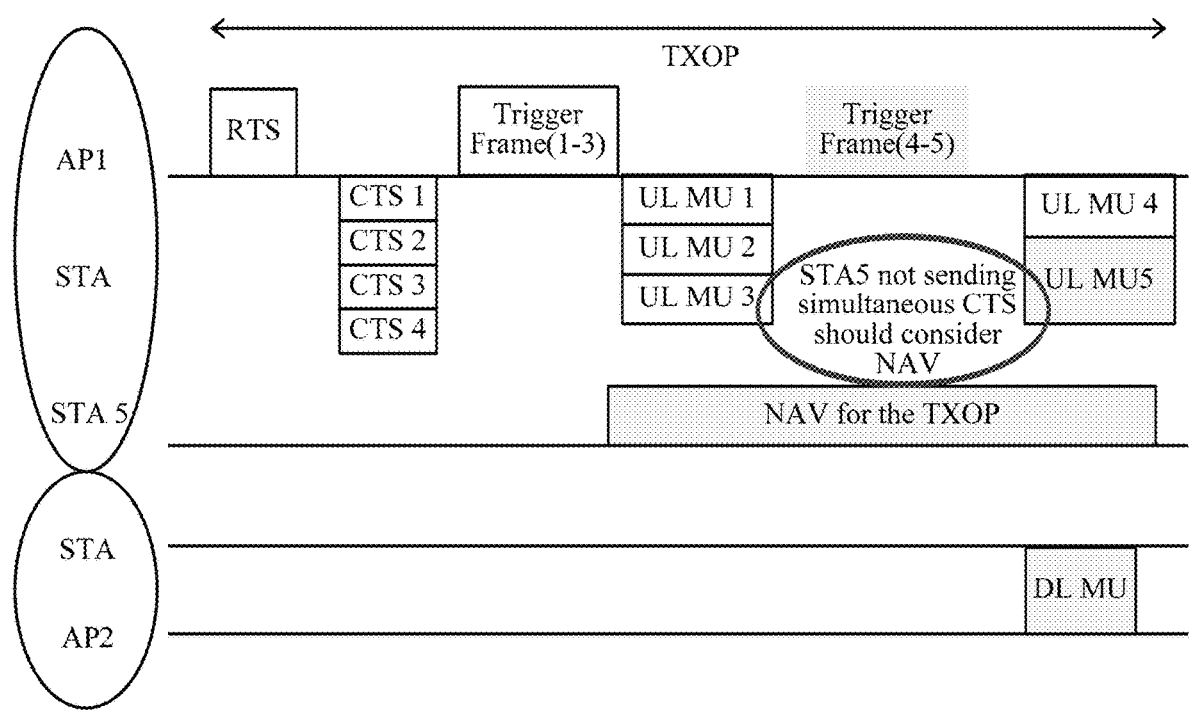

As shown in FIG. 11, a NAV of a STA 5 is set according to the first trigger frame (there is no uplink scheduling of the STA 5) sent by an AP in an intra-BSS. If the STA 5 does not respond with simultaneous CTS, when receiving a trigger frame for uplink scheduling of the STA 5 in a TXOP, the STA 5 needs to consider a NAV when sending a UL MU PPDU.

In Embodiment 14 of the present disclosure, when a current NAV value of a station is set according to an 802.11ax PPDU sent by a node (an access point or a station) in an intra basic service set (intra-BSS), and the station does not respond with a response frame CTS (for example, CTS, MU-CTS, e-CTS, or simultaneous CTS), after the station receives a trigger frame including uplink scheduling information of the station, the station considers the current NAV value as a condition for determining whether to send an uplink data frame. That the station does not respond with a response frame may be that the station receives RTS, but does not respond with CTS.

Embodiment 15

With reference to Embodiment 10 to Embodiment 14, Embodiment 15 of the present disclosure discloses a communication method in a wireless communications system. The method includes the following steps.

S21: A station receives an 802.11ax PPDU sent by a node (an access point or a station) in an intra basic service set (intra-BSS).

S22: If a condition of not considering a NAV is satisfied, after receiving a trigger frame including uplink scheduling information of the station, the station does not consider a NAV when determining whether to send an uplink data frame.

The condition of not considering a NAV includes that a current NAV value of the station is set according to the 802.11ax PPDU sent by the node (the access point or the station) in the intra basic service set. Alternatively, the condition of not considering a NAV includes that a current NAV value of the station is set according to the 802.11ax PPDU sent by the node (the access point or the station) in the intra basic service set, and that the station does not receive a request frame or a response frame (another node does not send a request frame or a response frame to the station, or the station does not receive a request frame or a response frame due to transmission). Alternatively, the condition of not considering a NAV includes that the station already responds with a response frame after receiving a request frame. Alternatively, the condition of not considering a NAV includes that a current NAV value of the station is set according to the 802.11ax PPDU sent by the node (the access point or the station) in the intra basic service set, and that the station already responds with a response frame after receiving a request frame.

S23: If the condition of not considering a NAV is not satisfied, after receiving the trigger frame including the uplink scheduling information of the station, the station considers the NAV when determining whether to send an uplink data frame. For example, when a current NAV value is not zero, the station does not perform channel contention or transmission.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A NAV (network allocation vector) setting method in a wireless communications system, the method comprising:
   setting, by a receiving node, a value, wherein the value is greater than or equal to −82 dBm;
   receiving, by the receiving node, a physical layer protocol data unit (PPDU); and
   performing, by the receiving node, a NAV mechanism based on at least the value and the PPDU, wherein the performing the NAV mechanism comprises keeping, by the receiving node, a current NAV value unchanged based on at least the value and the PPDU in response to a set of conditions being met, wherein the set of conditions at least comprises:
      a condition that the PPDU comprises a spatial reuse field (SR field), wherein a special value of the SR field indicates allowing spatial reuse;
      a condition that the PPDU is from an overlapping basic service set (OBSS); and
      a condition that a received signal strength index (RSSI) of the PPDU is less than the value.

2. The method according to claim 1, further comprising: performing, by the receiving node, spatial reuse based on performing the NAV mechanism.

3. The method according to claim 1, wherein the SR field is located in a HE-SIGA in the PPDU.

4. A receiving node, comprising:
   a processor, configured to set a value, wherein the value is greater than or equal to −82 dBm; and a receiver, configured to receive a physical layer protocol data unit (PPDU);
wherein the processor is further configured to perform a NAV (network allocation vector) mechanism based on at least the value and the PPDU, wherein the performing the NAV mechanism comprises keeping a current NAV value unchanged based on at least the value and the PPDU in response to a set of conditions being met, wherein the set of conditions at least comprises:
   a condition that the PPDU comprises a spatial reuse field (SR field), wherein a special value of the SR field indicates allowing spatial reuse;
   a condition that the PPDU is from an overlapping basic service set (OBSS); and
   a condition that a received signal strength index (RSSI) of the PPDU is less than the value.

5. The receiving node according to claim 4, wherein the processor is further configured to perform spatial reuse based on performing the NAV mechanism.

6. The receiving node according to claim 4, wherein the SR field is located in a HE-SIGA in the PPDU.

\* \* \* \* \*